US012712104B2

(12) United States Patent
DiFonzo et al.

(10) Patent No.: US 12,712,104 B2
(45) Date of Patent: Aug. 18, 2026

(54) MAGNETIC SYSTEMS INCORPORATING ELECTROPERMANENT MAGNET ARRAYS

(71) Applicant: Apple Inc., Cupertino, CA (US)

(72) Inventors: John C. DiFonzo, Redwood City, CA (US); Mitsutoshi Makihata, San Jose, CA (US); Jean-Marc Gery, Playa Del Rey, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 18/893,169

(22) Filed: Sep. 23, 2024

(65) Prior Publication Data

US 2025/0111972 A1 Apr. 3, 2025

Related U.S. Application Data

(60) Provisional application No. 63/541,259, filed on Sep. 28, 2023.

(51) Int. Cl.
*H01F 7/06* (2006.01)
*H01F 7/20* (2006.01)

(52) U.S. Cl.
CPC ............... *H01F 7/064* (2013.01); *H01F 7/20* (2013.01)

(58) Field of Classification Search
CPC .................................. H01F 7/064; H01F 7/20
See application file for complete search history.

(56) References Cited

U.S. PATENT DOCUMENTS

| | | | |
|---|---|---|---|
| 5,861,088 A | 1/1999 | Curtins | |
| 8,928,437 B2 | 1/2015 | Lauder et al. | |
| 8,994,483 B2 | 3/2015 | Dupraz et al. | |
| 9,665,125 B2 | 5/2017 | Browning et al. | |
| 9,728,360 B2 | 8/2017 | Birner et al. | |
| 10,031,559 B1 * | 7/2018 | Hamel | H01F 7/0252 |
| 11,056,948 B1 * | 7/2021 | Grundmann | H02K 7/1021 |
| 2002/0118856 A1 | 8/2002 | Croft et al. | |
| 2003/0234711 A1 | 12/2003 | Bernstein et al. | |
| 2004/0056651 A1 | 3/2004 | Marietta | |
| 2006/0226726 A1 | 10/2006 | Shim | |
| 2008/0148988 A1 | 6/2008 | Wamble | |
| 2010/0302199 A1 | 12/2010 | Taylor et al. | |
| 2012/0066865 A1 | 3/2012 | Lauder et al. | |
| 2012/0066873 A1 | 3/2012 | Lauder et al. | |

(Continued)

OTHER PUBLICATIONS

First Examination Report issued in India Application No. IN202414073179, dated May 26, 2026 in 7 pages.

*Primary Examiner* — Thienvu V Tran
*Assistant Examiner* — Christopher J Clark
(74) *Attorney, Agent, or Firm* — Kilpatrick Townsend & Stockton LLP

(57) ABSTRACT

Magnetic systems can include a controllable magnet array and a fixed magnetic array. The fixed magnetic array can include an array of permanent magnets having alternating polarization direction transverse to the array. Some controllable magnet arrays can include electropermanent magnets (EPMs) arranged end-to-end, with pole pieces between them aligned to the permanent magnets of the fixed magnet array. Each EPM can include a permanent magnet having a fixed magnetic orientation lateral to the array and antiparallel to the permanent magnet in an adjacent EPM and a switchable magnet whose magnetic orientation can be switched between parallel and antiparallel to the permanent magnet in the EPM.

20 Claims, 9 Drawing Sheets

(56) References Cited

U.S. PATENT DOCUMENTS

| | | | |
|---|---|---|---|
| 2012/0068797 | A1 | 3/2012 | Lauder et al. |
| 2012/0068919 | A1 | 3/2012 | Lauder et al. |
| 2012/0069502 | A1 | 3/2012 | Lauder et al. |
| 2012/0069503 | A1 | 3/2012 | Lauder et al. |
| 2012/0211990 | A1 | 8/2012 | Davey et al. |
| 2012/0319518 | A1 | 12/2012 | Rapoport |
| 2013/0176091 | A1 | 7/2013 | Lancaster-Larocque |
| 2014/0043121 | A1 | 2/2014 | Sartee et al. |
| 2014/0306064 | A1 | 10/2014 | Palmer |
| 2015/0277491 | A1 | 10/2015 | Browning et al. |
| 2016/0064129 | A1 | 3/2016 | Gluskin et al. |
| 2016/0315511 | A1 | 10/2016 | Rivellini et al. |
| 2017/0017273 | A1 | 1/2017 | Weldon et al. |
| 2017/0158356 | A1 | 6/2017 | Palmer et al. |
| 2017/0199469 | A1 | 7/2017 | Dams et al. |
| 2017/0207691 | A1 | 7/2017 | Hemati |
| 2017/0317569 | A1 | 11/2017 | Lu et al. |
| 2020/0365305 | A1* | 11/2020 | Jochum ..................... H01F 7/00 |

* cited by examiner

MAGNETIC SYSTEMS INCORPORATING ELECTROPERMANENT MAGNET ARRAYS

CROSS-REFERENCE TO RELATED APPLICATION

This application claims the benefit of U.S. Provisional Application No. 63/541,259, filed Sep. 28, 2023.

BACKGROUND

This disclosure relates to magnetic systems and in particular to magnetic systems that are switchable between attractive and repulsive states.

Magnetic latches can be used to hold two components in a closed position, in which opposing surfaces abut or touch each other. For example, permanent magnets can be included in the base and the lid of a laptop computer. When the lid is brought into proximity to the base, the permanent magnets can provide an attractive force to latch the lid to the base without consuming power. The attractive force can be overcome by the user pushing on the lid to open it, while making it less likely that the lid will simply fall open, e.g., while the laptop is being transported. Further, magnetic latches that lack moving parts may be more durable than mechanical latches.

However, permanent magnets can produce an external magnetic field even while the laptop is open. Thus, for instance, permanent magnets in the base that are strong enough to be effective for latching the lid may produce a strong enough field to affect or damage other nearby devices or items (such as a credit card) when the lid is open.

SUMMARY

Certain embodiments described herein relate to magnetic systems that can switch from an attractive to a repulsive magnetic force between components of the system. In some embodiments, the system may also have a neutral state in which little or no magnetic force is produced. A magnetic system can include a “fixed” magnet array that includes permanent magnets having fixed magnetic polarizations and a “switchable” magnet array that includes magnetic elements whose direction of magnetic polarizations can be switched into either of two opposing directions, such as electropermanent magnets. The permanent magnets and the switchable magnetic elements can be arranged in their respective arrays such that, depending on the state of the switchable magnetic elements, either an attractive magnetic force or a repulsive magnetic force (or in some cases negligible magnetic force) is produced between the fixed magnet array and the controllable magnet array.

Certain embodiments described herein relate to magnetic systems that incorporate electropermanent magnets (EPMs) as the switchable magnetic elements. EPMs provide a magnetic field that can be switched on or off using a current pulse. A current pulse in one direction switches the EPM on; a pulse in the other direction switches the EPM off. An EPM can retain its magnetization state (on or off) after the current pulse ends. Accordingly, power is required only while the magnetization state is being changed.

According to some embodiments, a magnetic system can include an electropermanent array and a fixed magnet array. The controllable magnet array can include two or more electropermanent magnets placed end-to-end. Each electropermanent magnet can include a first permanent magnet disposed proximate to an interface surface and having a fixed magnetic orientation along a longitudinal axis; a switchable magnet comprising a core made of a magnetic material and a coil of wire wound around the core along a longitudinal axis of the core, with the switchable magnet positioned on a distal side of the first permanent magnet and spaced apart from the first permanent magnet; and pole pieces disposed at each longitudinal end of the first permanent magnet and the switchable magnet, where the pole pieces are made of a soft magnetic material and extended across end surfaces of the first permanent magnet and the electropermanent magnet. The fixed magnetic orientations of the first permanent magnets in adjacent electropermanent magnets can be antiparallel to each other, and pole pieces can be shared between adjacent electropermanent magnets in the controllable magnet array. The fixed magnet array can include second permanent magnets arranged parallel to the interface surface such that each second permanent magnet aligns with one of the pole pieces of the controllable magnet array. Adjacent second permanent magnets can have fixed magnetic polarizations in opposite directions toward or away from the interface surface. A control and driver circuit can be coupled to each of the coils and configured to supply current pulses to the coils to switch a direction of magnetic polarization of the cores of the electropermanent magnets, thereby switching the electropermanent magnets between an ON state in which a direction of magnetic polarization of the core is parallel to the magnetic polarization of the first permanent magnet and an OFF state in which the direction of magnetic polarization of the core is antiparallel to the magnetic polarization of the first permanent magnet. The control and driver circuit can be configured to supply current pulses to different coils at different times.

If the second permanent magnets are aligned relative to the first permanent magnets such that the direction of magnetization is parallel to the direction of flux through the pole pieces when the electropermanent magnets are in the ON state, an attractive magnetic force between the fixed magnet array and the controllable magnet array can be produced by switching the electropermanent magnets to the ON state. If, however, the second permanent magnets are aligned relative to the first permanent magnets such that the direction of magnetization is antiparallel to the direction of flux through the pole pieces when the electropermanent magnets are in the ON state, a repulsive magnetic force between the fixed magnet array and the controllable magnet array can be produced by switching the electropermanent magnets to the ON state. In some embodiments, a magnetic system can include a first section in which the second permanent magnets are aligned relative to the first permanent magnets such that attractive magnetic force is provided and a second section in which the second permanent magnets are aligned relative to the first permanent magnets such that repulsive magnetic force is provided. By selectively switching different EPMs on and off, the magnetic system can provide attractive force, repulsive force, or a neutral state (e.g., with all EPMs in the OFF state) at different times.

Magnetic systems of this kind can be deployed to selectively create attractive and/or repulsive magnetic forces between two objects or surfaces. As just one example, an EPM array can be disposed in the base of a laptop and oriented toward the lid while a fixed magnet array is disposed in the lid and oriented toward the base. By controlling the EPM array or portions thereof, different magnetic forces can be produced at different times. For instance, an attractive force can be created to help close the lid or to secure the lid in the closed position and/or a repulsive force can be created to pop the lid open (or ajar) from a closed position. The EPM array can also be switched off when magnetic force is not desired (e.g., when the laptop is open for use), thereby reducing stray magnetic fields.

According to some embodiments, a magnetic system can include an electropermanent array and a fixed magnet array. The controllable magnet array can include two or more electropermanent magnets placed end-to-end. Each electropermanent magnet can include a first switchable magnet disposed proximate to an interface surface and having a first core made of a magnetic material and a first coil of wire wound around the first core along a longitudinal axis of the first core, together with a second switchable magnet having a second core made of a magnetic material and a second coil of wire wound around the second core along a longitudinal axis of the second core, with the second switchable magnet being positioned on a distal side of the first switchable magnet and spaced apart from the first switchable magnet. Pole pieces can be disposed at each longitudinal end of the first switchable magnet and the second switchable magnet, where the pole pieces are made of a soft magnetic material and extend across end surfaces of the first switchable magnet and the second switchable magnet. Pole pieces can be shared between adjacent electropermanent magnets in the controllable magnet array. The fixed magnet array can include permanent magnets arranged parallel to the interface surface such that each permanent magnet aligns with one of the pole pieces of the controllable magnet array. Adjacent permanent magnets can have magnetic polarizations in opposite directions toward or away from the interface surface. A control and driver circuit coupled to each of the first coils and second coils and configured to supply current pulses to the first coils and second coils, thereby switching the electropermanent magnets among a first ON state in which the magnetic polarizations of the first and second switchable magnets are parallel and in a first longitudinal direction, a second ON state in which the magnetic polarizations of the first and second switchable magnets are parallel and in a second longitudinal direction opposite the first longitudinal direction, and an OFF state in which the magnetic polarizations of the first and second switchable magnets are in antiparallel longitudinal directions. The control and driver circuit can be configured to supply current pulses to different coils at different times.

The following detailed description, together with the accompanying drawings, will provide a better understanding of the nature and advantages of the claimed invention.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

Certain embodiments described herein relate to magnetic systems that can switch from an attractive to a repulsive magnetic force between components of the system. In some embodiments, the system may also have a neutral state in which little or no magnetic force is produced. A magnetic system can include a "fixed" magnet array that includes permanent magnets having fixed magnetic polarizations and a "switchable" magnet array that includes electropermanent magnetic elements whose direction of magnetic polarizations can be switched into either of two opposing directions. The permanent magnets and the switchable magnetic elements can be arranged in their respective arrays such that, depending on the state of the switchable magnetic elements, either an attractive magnetic force or a repulsive magnetic force (or in some embodiments negligible magnetic force) is produced between the fixed magnet array and the controllable magnet array.

Certain embodiments described herein relate to magnetic systems that incorporate electropermanent magnets (EPMs) as the switchable magnetic elements. EPMs provide a magnetic field that can be switched on or off using a current pulse. A current pulse in one direction switches the EPM on; a pulse in the other direction switches the EPM off. An EPM can retain its magnetization state (on or off) after the current pulse ends. Accordingly, power is required only while the magnetization state is being changed.

Figure 1A:
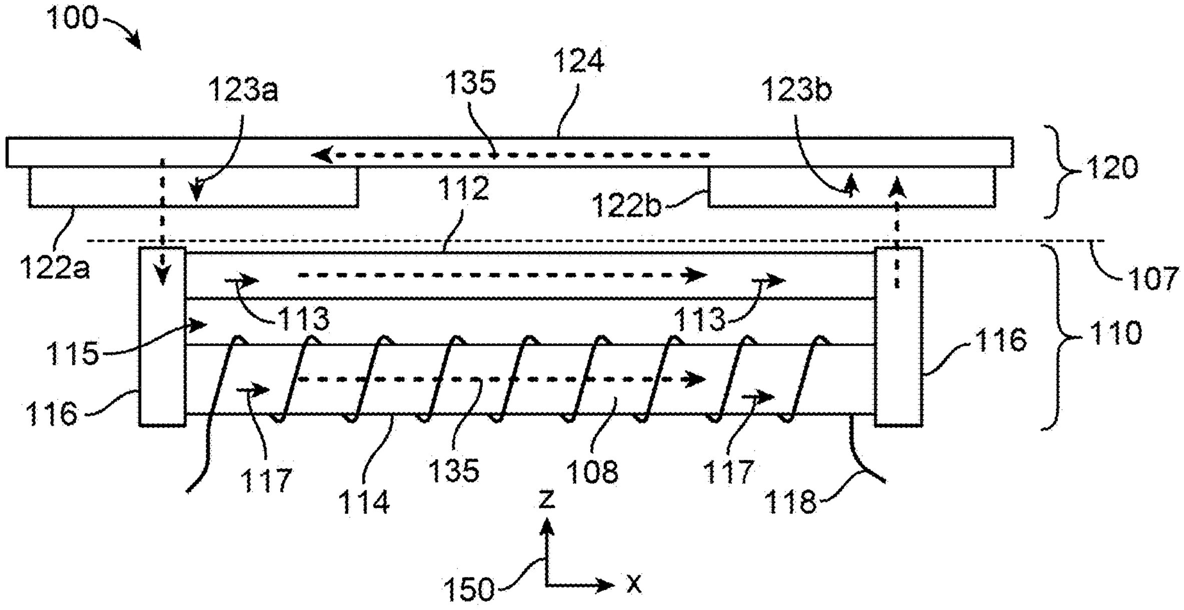
FIGS. 1A-1C show simplified side views of elements of a magnetic system according to some embodiments.
Figure 1B:
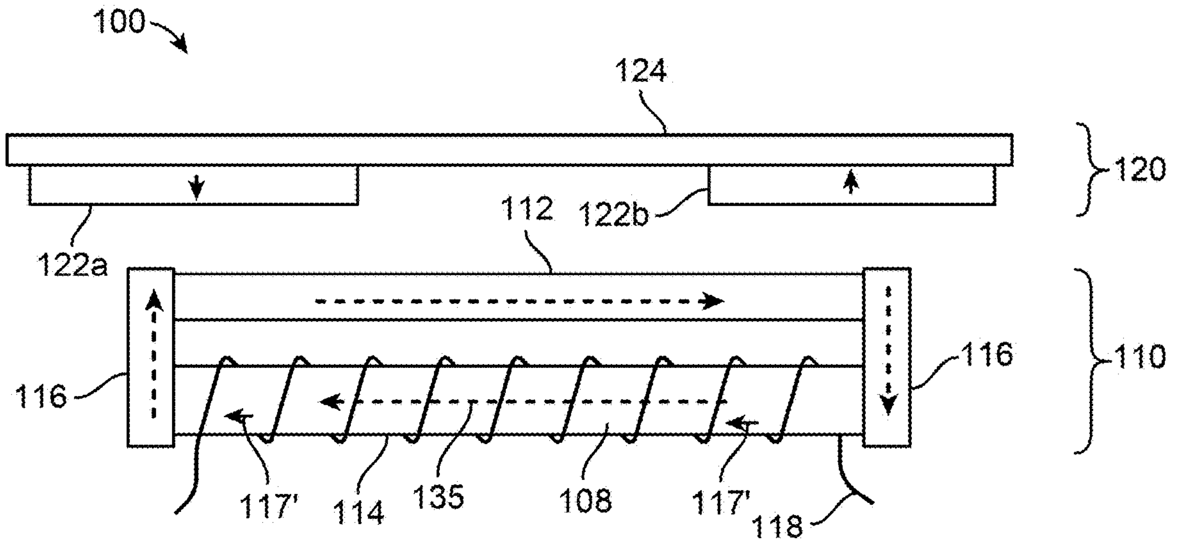

FIGS. 1A and 1B show simplified side views of elements of a magnetic system according to some embodiments. Shown are an electropermanent magnet (EPM) 110 and a fixed magnetic element 120. ("Fixed" is used herein to indicate that the magnetic polarization of a magnetic element does not change during device operation.) For convenience of description, a coordinate system can be defined as shown at 150 in FIG. 1A; the x-axis is sometimes referred to herein as a "longitudinal" dimension or direction, and the z-axis is sometimes referred to as "transverse" or "vertical," with "up" corresponding to the +z direction and so on. It should be understood that all directional terms are used for convenience of description and that a particular orientation in space is not required.

More specifically, EPM 110 includes a permanent magnet 112, a switchable magnet 114, and pole pieces 116. Permanent magnet 112 can be positioned proximate to an interface surface 107 (shown as a dashed line) while switchable magnet 114 is positioned on the distal side of permanent magnet 112 (i.e., farther from interface surface 107 than permanent magnet 112) and spaced apart from permanent magnet 112, creating a gap 115 along the z-axis. Pole pieces 116 are disposed at the longitudinal ends of permanent magnet 112 and switchable magnet 114 and span gap 115.

Permanent magnet 112 can be made of a magnetic material (i.e., a material that can be magnetized in a particular direction and sustain magnetization). In some embodiments, permanent magnet 112 is made of a material with high magnetic coercivity. For example, permanent magnet 112 can be a rare earth magnet such as a neodymium-iron-boron (NdFeB) magnet or the like. Permanent magnet 112 is magnetized, with magnetic polarity 113 (shown using arrows) fixedly oriented along a longitudinal direction (the +x direction in this example).

Switchable magnet 114 can have a core 108 made of a magnetic material. In some embodiments, core 108 can be made of a permanent (or hard) magnetic material with low magnetic coercivity. For example, core 108 can be made of an aluminum-nickel-cobalt material (AlNiCo) or the like. "High" and "low" are relative terms, and in this context signify that the coercivity of permanent magnet 112 can be higher than the coercivity of core 108; the relationship is described further below.

A conductive coil 118 (e.g., copper wire) is wrapped around core 108, e.g., such that the axis of the coil aligns with the easy axis of the magnetic material within core 108. In operation, the direction of magnetic polarization of core 108 (and therefore of switchable magnet 114) can be changed by driving a current pulse through coil 118 in one direction or the other. In FIG. 1A, switchable magnet 114 has magnetic polarity oriented in the +x direction, as shown by arrows 117, and in FIG. 1B, switchable magnet 114 has magnetic polarity oriented in the −x direction, as shown by arrows 117'. Once polarized in a particular direction by a current pulse, core 108 retains the polarization. Thus, current only needs to be supplied to coil 118 when it is desired to change the direction of polarization of switchable magnet 114.

Pole pieces 116 can be made of a soft magnetic material that acts as a magnetic shunt, such as steel, iron-cobalt (FeCo), or other material. Suitable materials are easily magnetized or demagnetized and can lose their magnetization when external magnetic fields are absent. Pole pieces 116 can be oriented to direct flux along the z-axis (toward or away from interface surface 107). For instance, many magnetic materials have a particular axis (sometimes referred to as an "easy axis") along which they can be easily magnetized in either direction, and pole pieces 116 can have their easy axes oriented parallel to the z-axis.

Fixed magnetic element 120 includes permanent magnets 122*a*, 122*b* and a support plate 124. Permanent magnets 122*a*, 122*b* can be made of a permanent magnetic material. In some embodiments, permanent magnets 122*a*, 122*b* are made of a material with high magnetic coercivity. Permanent magnets 122*a*, 122*b* can be but need not be made of the same material as permanent magnet 112. Permanent magnets 122*a*, 122*b* are magnetized, with magnetic polarity fixedly oriented along a direction transverse to (e.g., normal to) interface surface 107, as shown by arrows 123*a*. 123*b*. It should be noted that magnets 122*a*, 122*b* have magnetic polarity in opposite directions from each other; in this example, arrow 123*a* points down while arrow 123*b* points up. Support plate 124 can be made of a soft magnetic material that acts as a magnetic shunt to direct flux longitudinally, such as steel, iron-cobalt (FeCo), or other material.

In operation, by driving current pulses in coil 118 in different directions, EPM 110 can be switched between an "ON" state in which a magnetic force is created between EPM 110 and fixed magnetic element 120 and an "OFF" state in which negligible magnetic force is created between EPM 110 and fixed magnetic element 120. FIG. 1A shows EPM 110 in the ON state. In the ON state, magnetic polarity 117 of switchable magnet 114 has been switched (by driving a current pulse in coil 118) to be parallel with magnetic polarity 113 of permanent magnet 112. In this state, magnetic flux, indicated by large dashed arrows 135, flows in the +x direction through permanent magnet 112 and switchable magnet 114 and circulates through pole pieces 116, which direct flux vertically. As shown, flux is directed upward toward magnet 122*b*, which has magnetic polarity oriented upward (as indicated by arrow 123*b*), along support plate 124, and downward through magnet 122*a*, which has magnetic polarity oriented downward (as indicated by arrow 123*b*). The magnetic flux creates an attractive force between EPM 110 and fixed magnetic element 120. As described below, the attractive force can be used to hold two surfaces in contact, e.g., to latch a laptop lid (or door) in a closed position.

FIG. 1B shows EPM 110 in the OFF state. In the OFF state, magnetic polarity 117 of switchable magnet 114 has been switched (by driving a current pulse in coil 118) to be antiparallel with magnetic polarity 113 of permanent magnet 112, as indicated by arrows 117. In this state, magnetic flux, indicated by large dashed arrows 135, flows in the +x direction through permanent magnet 112 and in the opposite (−x) direction through switchable magnet 114. Pole pieces 116 provide a return flux path, and magnetic flux can be mostly or entirely confined within EPM 110. Since little or no magnetic flux reaches magnets 122*a*, 122*b* in fixed magnetic element 120, little or no force is exerted between EPM 110 and fixed magnetic element 120.

The particular dimensions, materials, and form factor of EPM 110 and fixed magnetic element 120 can be chosen as desired for a particular application, subject to various design considerations. For example, it is desirable that coil 118 can be used to flip the magnetic polarization of core 108 without affecting magnetic polarization of permanent magnet 112. In some embodiments, this can be achieved in part by making permanent magnet 112 and core 108 out of different magnetic materials such that permanent magnet 112 has higher coercivity than core 108. For instance, permanent magnet 112 can be a NdFeB magnet while core 108 is an AlNiCo magnet. In some embodiments, coercivity of permanent magnet 112 can be higher than coercivity of core 108 by a factor of 5 or 10; however, use of different magnetic materials is not required, and in some embodiments permanent magnet 112 and core 108 can be made of the same or similar materials. Given a particular combination of permanent magnet 112 and core 108, gap 115 can be made large enough (in the direction along the z-axis) that a current pulse of sufficient intensity (e.g., peak current) to flip the magnetic polarization of core 108 can be propagated through coil 118 without affecting permanent magnet 112. Further, it is also desirable that core 108 retain the magnetization imparted by a current pulse in coil 118, which may be opposite the magnetization of permanent magnet 112. To prevent permanent magnet 112 from affecting magnetic orientation of core 108 (or vice versa), gap 115 can have a height sufficient that magnetic reluctance prevents permanent magnet 112 from affecting core 108. These considerations set a minimum height for gap 115, with the particular value depending on the choice of magnetic materials and dimensions of the magnets. The height of gap 15 can be greater than the minimum if a larger form factor can be tolerated in a particular application.

Dimensions of permanent magnet 112, switchable magnet 114, and pole pieces 116 can be chosen to balance the flux and reduce flux leakage in the OFF state. In some embodiments, this may result in core 108 being significantly taller (along the z-direction) than permanent magnet 112.

Dimensions of permanent magnets 122*a*, 122*b* can be chosen as desired. In some embodiments, permanent magnets 122*a*, 122*b* can be as wide (along the x-direction) as EPM 110, with magnets 122*a*, 122*b* being offset such that each magnet 122*a*, 122*b* is centered over one or the other of pole pieces 116. If desired, a space can be provided between permanent magnets 122*a*, 122*b*. Balancing of flux between EPM 110 in the ON state and fixed magnetic element 120 is not required.

Figure 1C:
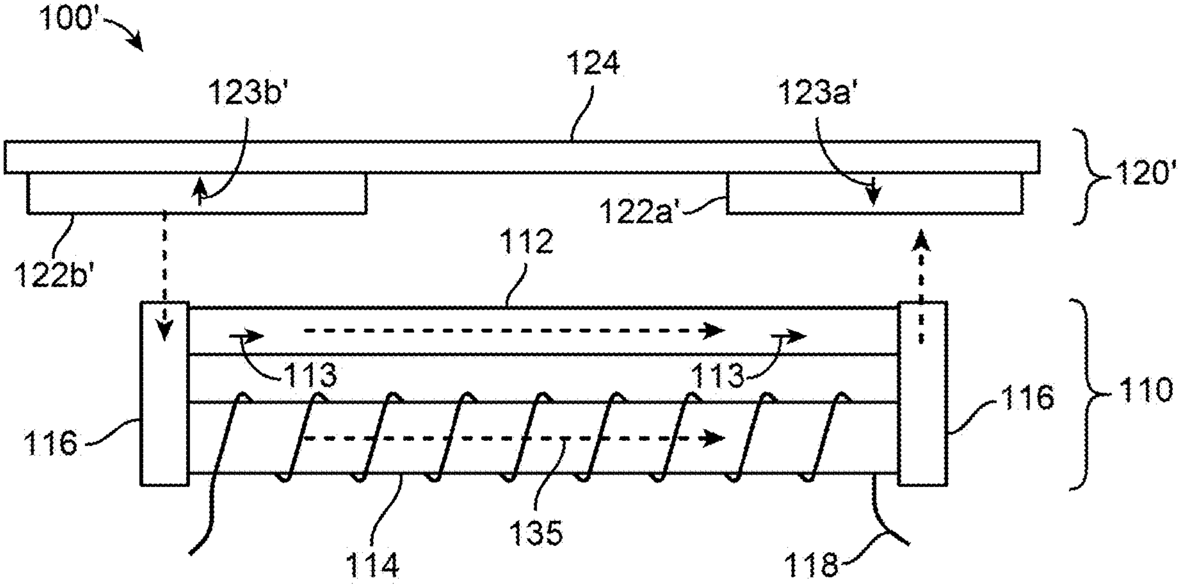

In some embodiments, the alignment of EPM 110 and permanent magnets 122 in fixed magnetic element 120 can be modified so that the ON state of EPM 110 provides magnetic repulsion rather than attraction. FIG. 1C shows a simplified side view of an arrangement of magnetic elements that can provide repulsive force according to some embodiments. Shown are EPM 110 and fixed magnetic element 120'. EPM 110 can be identical to the corresponding element in FIGS. 1A and 1B. Fixed magnetic element 120' can be similar to fixed magnetic element 120 described above and can include permanent magnets 122*a*', 122*b*' and support plate 124. Permanent magnet 122*a*' has magnetic polarity in the −z direction (as shown by arrow 123*a*') while magnet 122*b*' has magnetic polarity in the +z direction (as shown by arrow 123*b*'). The alignment between permanent magnets 122*a*', 122*b*' and permanent magnet 112 of EPM 110 is different from that in FIG. 1A. In FIG. 1A, when EPM 110 is in the ON state, magnetic polarities 123*a*, 123*b* result in an attractive force. In contrast, FIG. 1C shows that when EPM 110 is in the ON state, magnetic polarities 123*a*', 122*b*' result in a repulsive force between EPM 110 and fixed magnetic element 120'.

Accordingly, different of magnetic elements can provide either attraction or repulsion when EPM 110 is in the ON state. Assuming the magnets in fixed magnetic element 120 have fixed polarization and are at fixed positions along the longitudinal direction, whether the ON state of EPM 110 produces attractive or repulsive force on fixed magnetic element 120 depends on the alignment of magnets 122*a*, 122*b* relative to permanent magnet 112.

Figure 2:
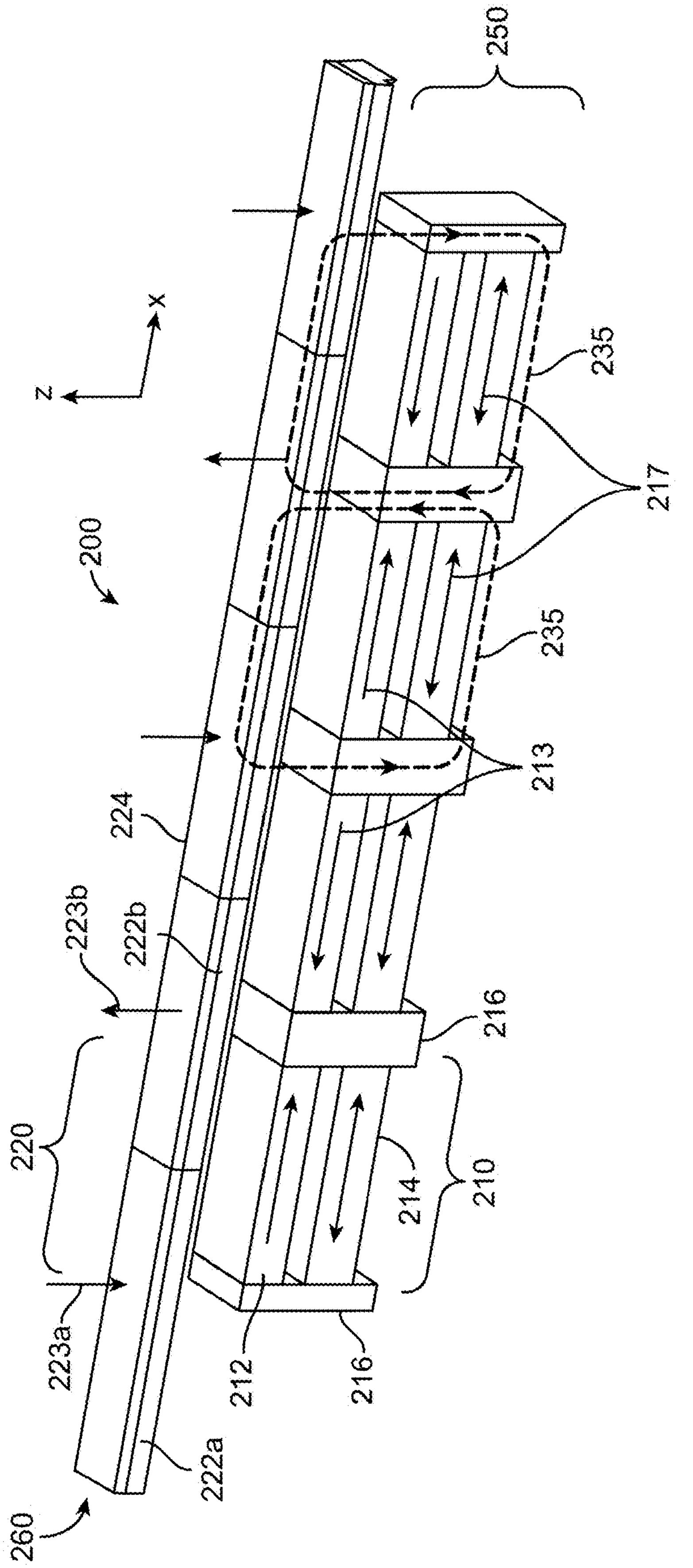
FIG. 2 shows a simplified perspective view of a magnetic system according to some embodiments.

In some embodiments, a magnetic system can include arrays of magnetic elements of the kind shown in FIGS. 1A-1C. FIG. 2 shows a simplified perspective view of a magnetic system 200 according to some embodiments. Magnetic system 200 includes a controllable magnet array 250 and a fixed magnet array 260. Controllable magnet array 250 can include an array of EPMs 210, each of which can be an instance of EPM 110, arranged end-to-end. For example, each EPM 210 can include a permanent magnet 212 (corresponding to permanent magnet 112 in FIGS. 1A and 1B), a switchable magnet 214 (corresponding to switchable magnet 114 in FIGS. 1A and 1B), with pole pieces 216 (corresponding to pole pieces 116 in FIGS. 1A and 1B) disposed at either end. Pole pieces 216 can be shared between adjacent EPMs 210. EPMs 210 are arranged such that permanent magnets 212 in adjacent EPMs 210 have magnetic polarity in opposite directions, as shown by green arrows 213. Each EPM 210 is switchable (by applying a current pulses in different directions to the coil of switchable magnet 214 as described above) between an ON state in which the magnetic polarity of switchable magnet 214 is parallel to the magnetic polarity of corresponding permanent magnet 212 (i.e., the permanent magnet 212 in the same EPM 210) and an OFF state in which the magnetic polarity of switchable magnet 214 is antiparallel to the magnetic polarity of corresponding permanent magnet 212; the switchability is indicated by dual-headed red arrows 217. Each switchable magnet 214 can have its own coil, and coils for different switchable magnets 214 can be pulsed independently. For instance, as described below, different EPMs 210 may be switched sequentially from ON to OFF or vice versa.

As described above with reference to FIGS. 1A and 1B, each EPM 210 has an ON state in which the magnetic polarity of switchable magnet 214 is parallel to the magnetic polarity of permanent magnet 212 and an OFF state in which the magnetic polarity of switchable magnet 214 is antiparallel to the magnetic polarity of permanent magnet 212. Current pulses can be applied to switch between the two states.

Fixed magnet array 260 can include an array of fixed magnetic elements 220, each of which can be an instance of fixed magnetic element 120 of FIGS. 1A and 1B. For example, each fixed magnetic element 220 can include permanent magnets 222*a*, 222*b* (corresponding to permanent magnets 122*a*, 122*b* in FIGS. 1A and 1B) having magnetic polarity in opposite directions (as indicated by arrows 223*a*, 223*b*) and a support plate 224 (corresponding to support plate 124 in FIGS. 1A and 1B). Permanent magnets 222*a*, 222*b* alternate polarity direction along the length of fixed magnet array 260, and the same permanent magnet can be shared between adjacent fixed magnetic elements 220. For instance, each permanent magnet 222*a*, 222*b* can be centered over one of pole pieces 216.

When EPMs 210 are in the ON state, flux circulates in loops shown by large dashed arrows 235. It should also be noted that flux loops produced by adjacent EPMs 210 circulate in opposite directions (as shown) so that contributions to flux through a given pole piece 216 from the switchable magnet element at either side align in the same direction, which can increase the force on fixed magnet array 260. In this example, fixed magnetic element 220 is arranged such that the magnetic flux creates an attractive force when EPMs 210 are in the ON state. As shown by arrows 236, flux in pole pieces 216 flows upward where permanent magnets 222*b* are located and downward where permanent magnets 222*a* are located, resulting in an attractive force.

Figure 3A:
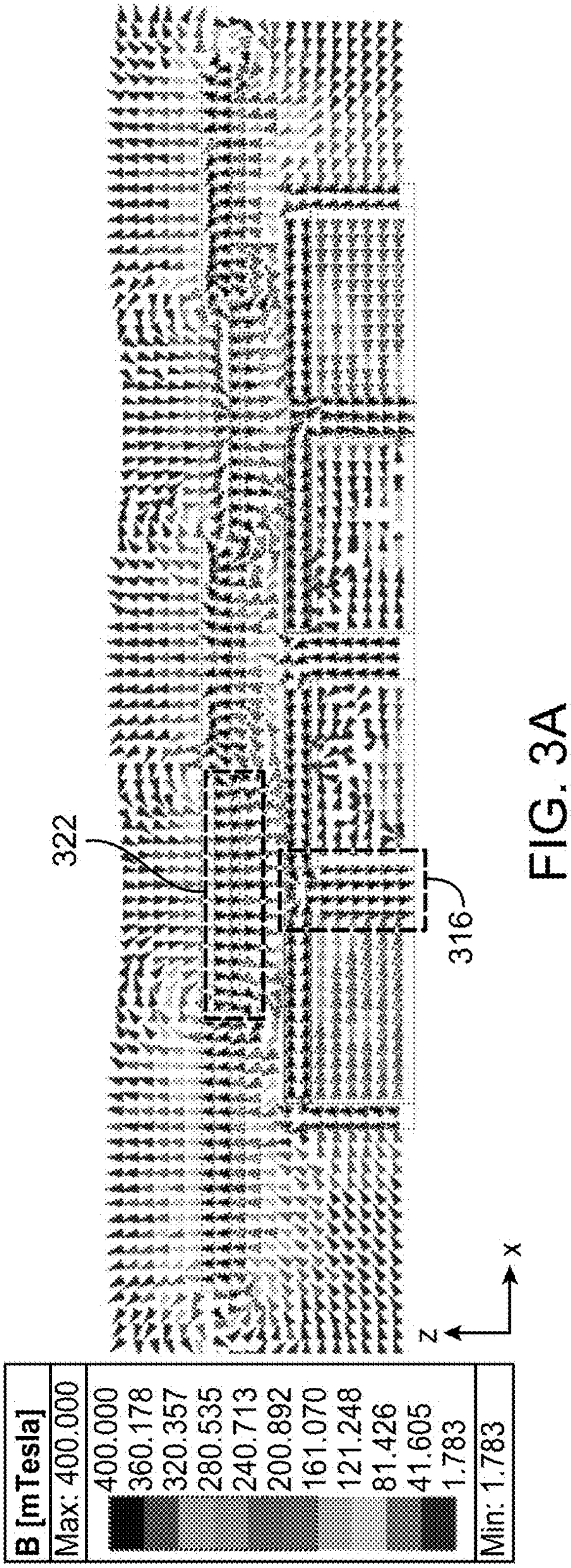
FIGS. 3A and 3B are two-dimensional plots illustrating magnetic flux in a magnetic system according to some embodiments.
Figure 3B:
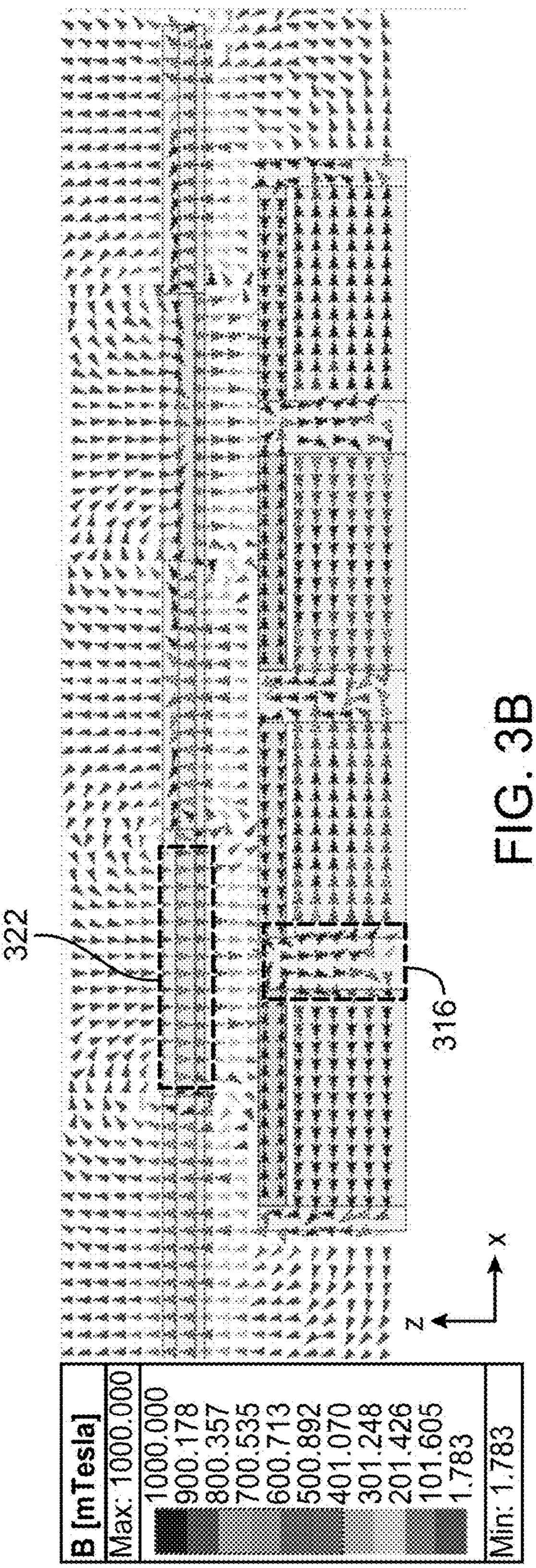

FIGS. 3A and 3B are two-dimensional plots illustrating magnetic flux in a magnetic system similar to system 200 according to some embodiments. For various points in space, magnetic field strength is indicated using a color scale, and direction is indicated using arrows. FIG. 3A shows a plot when the switchable magnetic elements are all in the ON state. As can be seen, a strong field component in the z direction is created in the permanent magnets of the fixed magnet array (e.g., region 322 in FIG. 3A) that aligns with the flux in the z direction in the pole pieces of the controllable magnet array (e.g., region 316 in FIG. 3A). In this manner, an attractive magnetic force can be created. FIG. 3B shows a corresponding plot when the switchable magnetic elements are all in the OFF state. The magnetic field is substantially reduced in both regions 316 and 322, indicating little or no attractive force.

Figure 4:
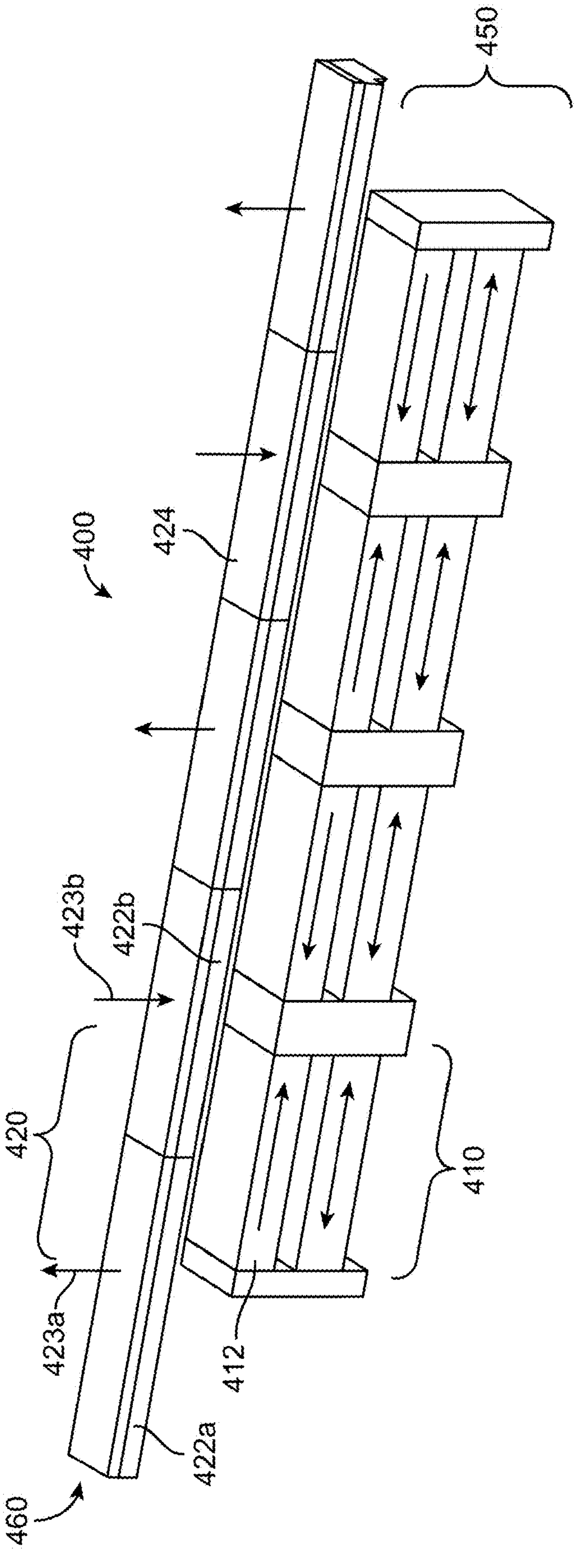
FIG. 4 shows a simplified perspective view of a magnetic system according to some embodiments.

In some embodiments, a magnetic system that provides repulsive magnetic force can be created by reversing the polarity of the fixed magnets (e.g., as illustrated in FIG. 1C). FIG. 4 shows a simplified perspective view of a magnetic system 400 according to some embodiments. Magnetic system 400 includes a controllable magnet array 450 and a fixed magnet array 460. Controllable magnet array 450 can include an array of EPMs 410, each of which can be an instance of EPM 110 of FIGS. 1A and 1C, arranged end-to-end. EPMs 410 can be arranged with fixed magnets 412 having alternating polarity, as described above with reference to FIG. 2. Fixed magnet array 460 can include an array of fixed magnetic elements 420, each of which can be an instance of fixed magnetic element 120' of FIG. 1C. For example, each fixed magnetic element 420 can include permanent magnets 422*a*, 422*b* (corresponding to permanent magnets 122*a*', 122*b*' in FIG. 1C) having magnetic polarity in opposite directions (as indicated by arrows 423*a*, 423*b*) and a support plate 424 (corresponding to support plate 124 in FIGS. 1A and 1B). Permanent magnets 422*a*, 422*b* alternate polarity direction along the length of fixed magnet array 460, and the same permanent magnet can be shared between adjacent fixed magnetic elements 420. For instance, each permanent magnet 422*a*, 422*b* can be centered over one of pole pieces 416.

Compared to magnetic system 200 of FIG. 2, permanent magnets 422*a*, 422*b* have an alignment relative to permanent magnets 412 that is reversed from the alignment of permanent magnets 222*a*, 222*b* relative to permanent magnets 212. As described above with reference to FIG. 1C, this configuration gives rise to a repulsive magnetic force when EPMs 410 are switched to the ON state (and little or no magnetic force when EPMs 410 are switched to the OFF state). Repulsive force can be used, e.g., to assist a user in opening a closed laptop lid or creating separation between surfaces in other contexts.

It may be desirable for a magnetic system to provide attraction and repulsion at different times. For example, when a user closes the lid of a laptop, it may be desirable for the lid to be drawn closed and/or held closed using magnetic attraction. When a user begins to open the lid, it may be desirable to provide magnetic repulsion to facilitate the opening action. Accordingly, some embodiments provide dual-action magnetic systems that can be operated to selectively provide attraction, repulsion, or a "neutral" (or "off") state of low magnetic force. For example, one section of a magnet array can be configured for attraction (e.g., as in FIG. 2) while another section is configured for repulsion (e.g., as in FIG. 4).

Figure 5:
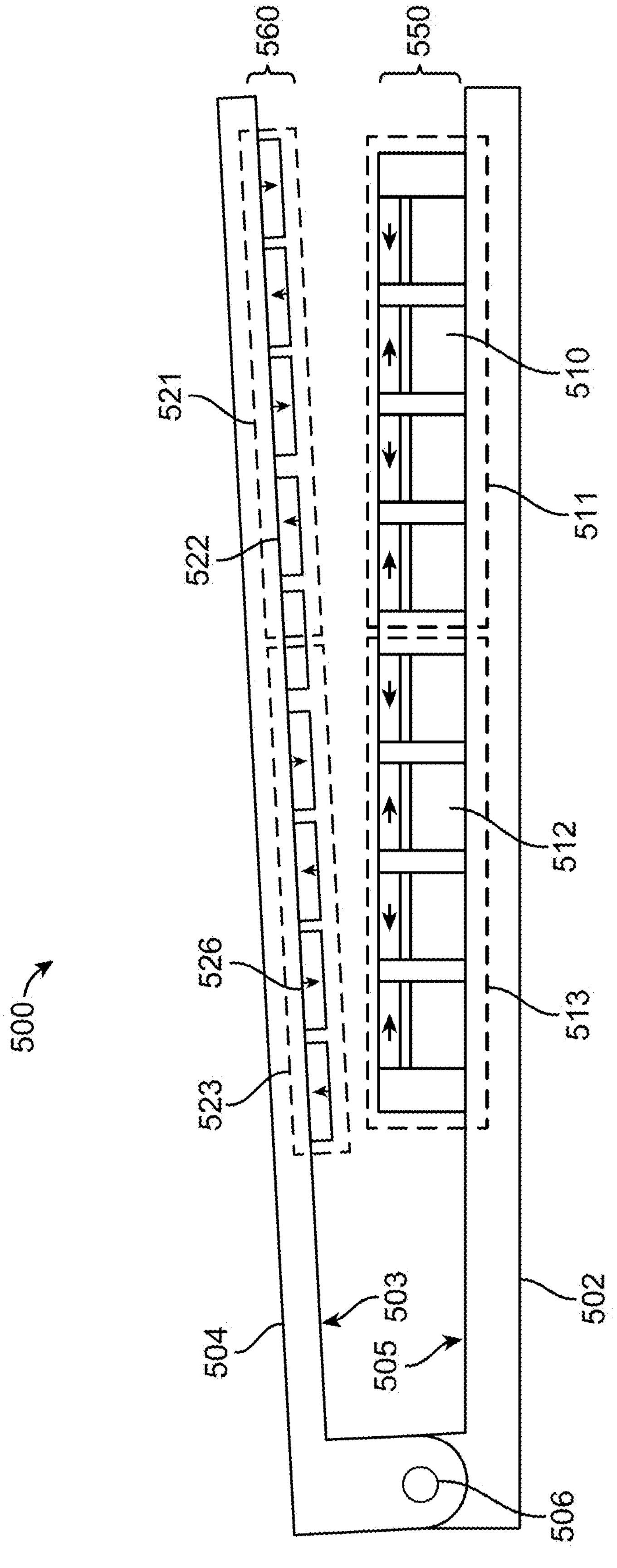
FIG. 5 shows a simplified side view of a device that incorporates a dual-action magnetic system according to some embodiments.

FIG. 5 shows a simplified side view of a device 500 that incorporates a dual-action magnetic system according to some embodiments. Device 500 can be, for example, a laptop computer having a base 502 (which may include keyboard, trackpad, or the like) and a lid 504 (which may include a display, camera, and the like). Base 502 and lid 504 can be connected by a hinge 506, and lid 504 can pivot on hinge 506 between open and closed positions. It should be understood that device 500 can be any device that may be opened and closed, and that base 502 and lid 504 can correspond to any two components having opposing surfaces that are brought together (into a closed position where at least a portion of the opposing surfaces abut each other) or moved apart (into an open position). As used herein, base 502 can be any structure that incorporates a controllable magnet array of a magnetic system, while lid 504 can be any structure that incorporates a fixed magnet array.

A controllable magnet array 550 can be attached to or housed within base 502, oriented toward interface surface 503 of lid 504. A fixed magnet array 560 can be attached to or housed within lid 504, oriented toward interface surface 505 of base 502. Controllable magnet array 550 and fixed magnet array 560 can be oriented such that they come into proximity with each other as lid 504 moves toward the closed position. Direct contact between controllable magnet array 550 and fixed magnet array 560 when in the closed position is not required; however, smaller gaps between controllable magnet array 550 and fixed magnet array 560 correspond to increased magnetic strength (if all other factors are equal). Any intervening surfaces (e.g., a housing of base 502 or lid 504) should have low magnetic permeability so that flux can pass through. For instance, a plastic cover may be disposed over either or both of controllable magnet array 550 and fixed magnet array 560 to protect and/or conceal the magnets.

In some embodiments, controllable magnet array 550 includes two independently operable sections: section 511 and section 513. Each section 511, 513 can include an array of EPMs 510, 512 which can be similar or identical to EPMs 110 (FIGS. 1A-1C), 210 (FIG. 2), or 410 (FIG. 4) described above. Similarly, fixed magnet array 560 can be configured in two sections: section 521 and section 523. In section 521, permanent magnets 522 can be arranged in the manner described above with reference to magnets 222*a*, 222*b* of FIG. 2, so that attractive magnetic force is created between section 511 of controllable magnet array 550 and section 521 of fixed magnet array 560 when section 511 of controllable magnet array 550 is in the ON state and negligible force is created when section 511 of controllable magnet array 550 is in the OFF state. In section 523, permanent magnets 526 can be arranged in the manner described above with reference to magnets 422*a*, 422*b* of FIG. 4, so that repulsive magnetic force is created between sections 513 of controllable magnet array 550 and section 523 of fixed magnet array 560 when section 513 of controllable magnet array 550 is in the ON state and negligible force is created when section 513 of controllable magnet array 550 is in the OFF state.

In operation, when lid 504 is open (e.g., during normal laptop use), sections 511 and 513 of controllable magnet array 550 can both be in the OFF state, which (as described above) reduces stray magnetic flux in the vicinity of controllable magnet array 550. When lid 504 is moved into or toward the closed position, section 511 of controllable magnet array 550 can be switched to the ON state (while section 513 remains in the OFF state), thereby providing attractive magnetic force toward section 521 of fixed magnet array 560. The attractive magnetic force may help draw lid 504 into the closed position and/or secure lid 504 in the closed position (e.g., by leaving section 511 in the ON state). It should be noted that power is consumed only when switching section 511 (or section 513) between states, and leaving section 511 in the ON state does not consume power.

When the user initiates opening of lid 504 from the closed position (e.g., by touching a sensor on the edge of the lid or exerting upward force or the like), section 511 of controllable magnet array 550 can be switched to the OFF state to release the attractive force toward section 521 of fixed magnet array 560. In addition, section 513 of controllable magnet array 550 can be switched to the ON state to create a repulsive force toward section 523 of fixed magnet array 560. This repulsive force can assist the user in lifting lid 504 or can cause lid 504 to pop open, creating a gap between lid 504 and base 502 that may facilitate further movement of lid 504 into a desired position for operating device 500.

In the example of FIG. 5, attractive sections 511 and 521 are positioned farther from hinge 506 than repulsive sections 513, 523. This can create a difference between the magnitude of attraction and repulsion. For instance, a longer lever arm requires greater torque to overcome the attractive magnetic force between sections 511 and 521 and a smaller repulsive force between sections 513 and 523 to move lid 504 upward. Other arrangements are also possible, including reversing the positions of the attractive and repulsive sections or rotating the array such that both sections are at the same distance from the pivot axis defined by hinge 506.

Figure 6:
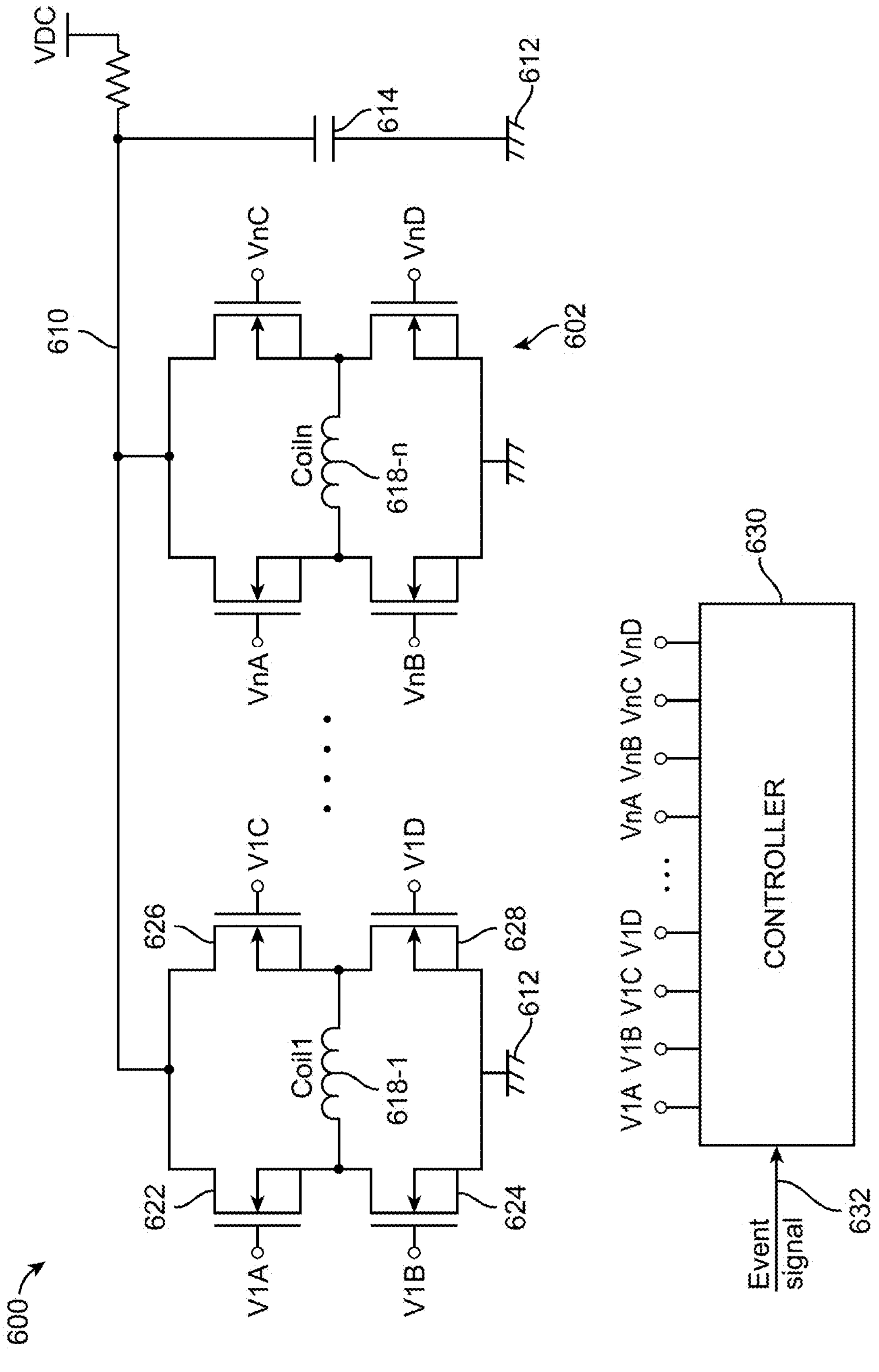
FIG. 6 shows a simplified schematic diagram of a control and driver circuit for magnetic systems according to some embodiments.

In some embodiments, the coil in each EPM (e.g., EPM 210 of FIG. 2, EPM 410 of FIG. 4, or EPMs 510, 512 of FIG. 5) can be independently pulsed. FIG. 6 shows a simplified schematic diagram of a control and driver circuit 600 according to some embodiments. Control and driver circuit 600 can include a driver section 602 that can selectively drive pulses to one or more of a number (n) of coils 618-1 through 618-*n*. Each coil 618 can be a coil wound around a low-coercivity magnetic core in a switchable magnetic element (as described above). To controllably drive current through coil 618-1, transistors 622 and 624 are coupled in series between an input voltage and ground. In parallel, transistors 626 and 628 are coupled in series between the input voltage and ground. One end of coil 618-1 is coupled between transistors 622 and 624 as shown, while the other end of coil 618-1 is coupled between transistors 626 and 628. By applying a first pattern of voltages to gates V1A, V1B, V1C, and V1D, transistors 622 and 628 can be switched on while transistors 624 and 626 are switched off, allowing current to flow in one direction through coil 618-1. By applying a second pattern of voltages to gates V1A, V1B, V1C, V1D, transistors 622 and 628 can be switched off while transistors 624 and 626 are switched on, allowing current to flow in the other direction through coil 618-1. When all transistors 622, 624, 626, 628 are switched off, no current flows through coil 618-1. The arrangement of transistors 622, 624, 626, 628 can also prevent ringing in coil 618-1 following a current pulse. A similar arrangement of transistors can be provided for each coil 618-1 through 618-*n*. Since gate voltages are provided separately to each transistor, pulses can be supplied to each coil independently of any other coil. Capacitor 614 can be provided to create a current surge, allowing narrower pulses and/or higher peak current for a given amount of power. Those skilled in the art will appreciate that peak current in coil 618-1 (or any of coils 618) is the critical parameter for changing direction of magnetic polarization of a magnetic core and that the particular current required depends on the coil design (e.g., number of turns) and the geometry of the magnetic core. In some embodiments, pulse duration can be short (e.g., 10 to 100 microseconds). Shorter pulses allow faster switching between states; however, very short pulses may create eddy currents that can reduce the resultant magnetization in the core.

Control and driver circuit 600 can also include a controller 630, which can be implemented using a programmable microcontroller, FPGA, ASIC or the like. Controller 630 can have an input path 632 coupled to receive event signals. Event signals can indicate, for instance, that the controllable magnet array or sections thereof should be switched to the other state (e.g., from ON to OFF or vice versa). Responsive to the event signals, controller 630 can output voltages V1A, V1B, V1C, V1D to the gates of transistors 622, 624, 626, 628 to drive current (or not) in coil 618-1, and similarly for each other coil 618. In this example, controller 630 can drive the gate voltage of each transistor separately. Patterns or sequences of changes to voltages output by controller 630 can be defined to optimize state transitions in a magnet array (or a section thereof). For example, each coil in a magnet array (or a section thereof) can receive a current pulse in turn. Sequential pulsing of the coils may reduce peak power consumption as compared to parallel pulsing of all coils. As another example, in an array that has attractive and repulsive sections (e.g., controllable magnet array 550 of FIG. 5), it may be desirable to pulse the coils to switch one section to the OFF state before switching the other section to the ON state.

Using control and driver circuit 600, the total time to effect a transition of the EPMs in a controllable magnet array between ON and OFF states after receiving an event signal depends on various considerations, including the number of coils (assuming one coil is pulsed at a time), the duration of a current pulse and the time between current pulses. In some embodiments for an array with four switchable elements in an attractive section and four switchable elements in a repulsive section, the total time can be a millisecond or less, short enough that a user would not perceive the response as delayed.

Figure 7:
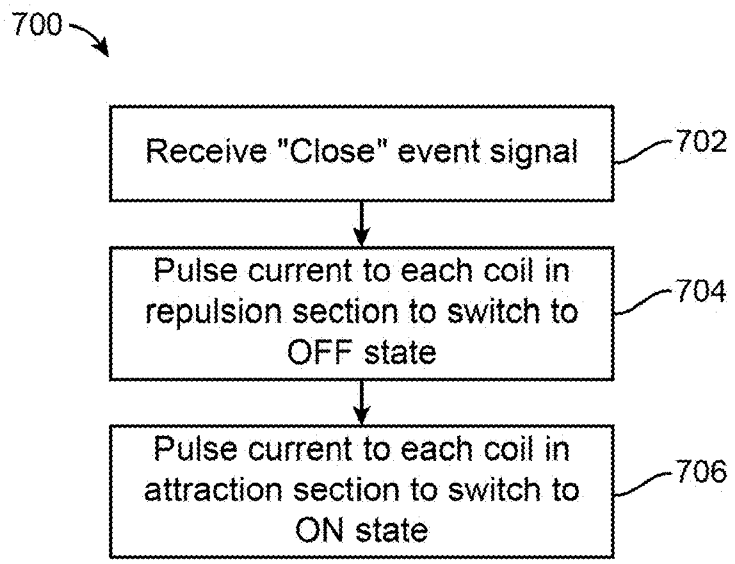
FIGS. 7 and 8 show flow diagrams of processes that can be implemented in a control and driver circuit according to some embodiments.
Figure 8:
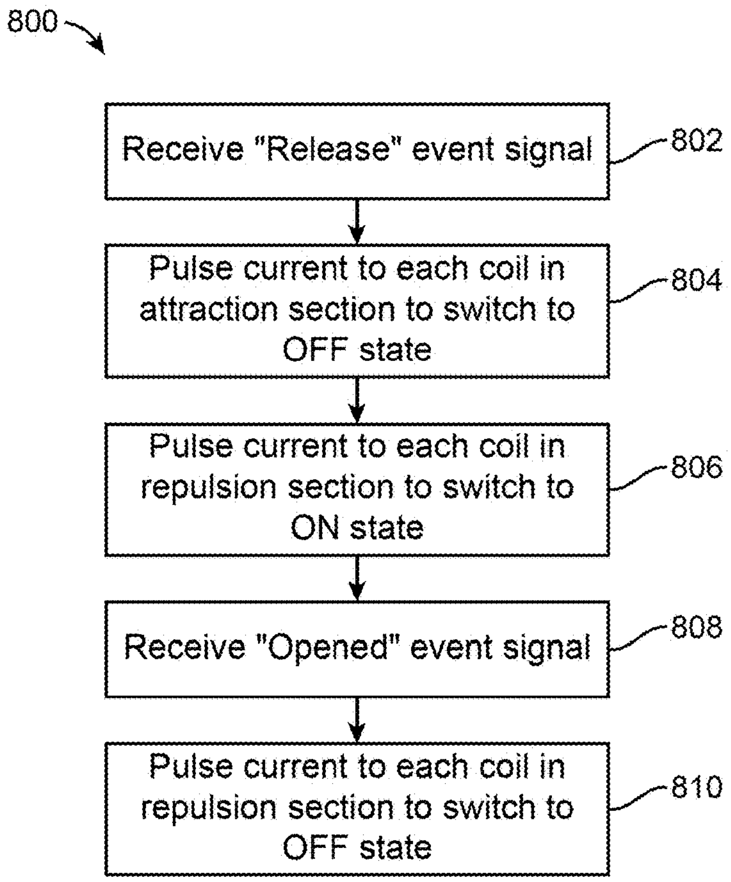

Further illustrating operation of controller 630, FIGS. 7 and 8 show flow diagrams of processes that can be implemented in controller 630 according to some embodiments. In this example, controller 630 is used to control controllable magnet array 550 of FIG. 5, which includes an attractive section 511 and a repulsive section 513.

FIG. 7 shows a flow diagram of a process 700 that controller 630 can execute in response to an event signal that indicates a transition to the closed state according to some embodiments.

At block 702, controller 630 can receive an event signal (e.g., via input path 632) indicating that lid 504 is being closed. Depending on implementation and the particulars of device 500, a "Close" event signal can be generated under various conditions. For example, a force or acceleration sensor in lid 504 can detect movement toward the closed position, or the user may operate a control (e.g., press a button, touch a particular surface, or issue a voice command) to indicate that lid 504 should be closed or that the magnetic latch should be engaged. In some embodiments, a "Close" event signal may be generated during initial power-up of device 500 to initialize the magnetic system into a known state.

At block 704, controller 630 can pulse current through each coil in repulsion section 513 of controllable magnet array 550 to drive EPMs 512 to the OFF state. For instance, controller 630 can deliver a current pulse through a given coil by applying appropriate voltages on the gates of the transistors coupled to that coil, as described above. In some embodiments, the voltages can be controlled so that one coil at a time receives a current pulse. The result of block 704 can be that repulsion section 513 exerts little or no force on repulsion section 523. At block 706, controller 630 can pulse current through each coil in attraction section 511 of controllable magnet array 550 to drive EPMs 510 to the ON state. For instance, controller 630 can deliver a current pulse through a given coil by applying appropriate voltages to the gates of the transistors coupled to that coil, as described above. In some embodiments, the voltages can be controlled so that one coil at a time receives a current pulse. The result of block 706 can be that attraction section 511 exerts attractive force on attraction section 521. Thus, lid 504 can be drawn toward or held in a closed position adjacent to (e.g., such that at least a portion of lid 504 abuts) base 502.

FIG. 8 shows a flow diagram of a process 800 that controller 630 can execute in response to an event signal that indicates a transition to the open state.

At block 802, controller 630 can receive a "Release" event signal (e.g., via input path 632) indicating that the magnetic latch should be released Depending on implementation and the particulars of device 500, a "Release" event signal can be generated under various conditions. For example, a force or acceleration sensor in lid 504 can detect movement away from the closed position, or the user may operate a control (e.g., press a button, touch a particular surface, or issue a voice command) to indicate that lid 504 should be opened or that the magnetic latch should be released (or disengaged). In some embodiments, the state machine in the component that generates event signals can be designed such that a "Release" event signal is generated only if the preceding event signal was a "Close" signal.

At block 804, controller 630 can pulse current through each coil in attraction section 511 of controllable magnet array 550 to drive EPMs 510 to the OFF state. For instance, controller 630 can deliver a current pulse through a given coil by applying appropriate voltages on the gates of the transistors coupled to that coil, as described above. In some embodiments, the voltages can be controlled so that one coil at a time receives a current pulse. The result of block 804 can be that attraction section 511 ceases to exert a significant attractive force on attraction section 521. At block 806, controller 630 can pulse current through each coil in repulsion section 513 of controllable magnet array 550 to drive EPMs 512 to the ON state. For instance, controller 630 can deliver a current pulse through a given coil by applying appropriate voltages on the gates of the transistors coupled to that coil, as described above. In some embodiments, the voltages can be controlled so that one coil at a time receives a current pulse. The result of block 806 can be that repulsion section 513 exerts repulsive force on repulsion section 523. Thus, lid 504 can be pushed away from base 502, creating a gap between the two. From there, the user (or an electrical or mechanical element that applies additional force) can further open lid 504.

In some embodiments, it may not be desirable to leave the switchable magnet elements of repulsion section 513 in the ON state while lid 504 is open. For instance, switchable magnetic elements of repulsion section 513 may generate enough external flux in the ON state to interfere with or affect nearby devices or objects (e.g., credit cards) while lid 504 is open. Accordingly, at block 808, controller 630 can receive an "Opened" event signal, indicating that lid 504 has been opened to a sufficient degree that repulsion section 513 is no longer contributing to further opening of lid 504. In response to the "Opened" event signal, controller 630 can pulse current through each coil in repulsion section 513 of controllable magnet array 550 to drive EPMs 512 to the OFF state.

In various embodiments, other events can be used to trigger switching of EPMs 512 to the OFF state, in addition to or instead of the "Opened" event signal at block 808. For example, a timer can be used. The timer can start, e.g., when controller 630 completes block 806 of process 800 and can expire after a prescribed time (e.g., five seconds, twenty seconds, or the like), after which controller 630 proceeds to block 808.

It should be understood that processes 700 and 800 are illustrative and that variations and modifications are possible. In some embodiments, controller 630 can sequence the gate voltages delivered to driver section 602 such that a current pulse is supplied to only coil at a time. In process 700, all EPMs 512 in repulsion section 513 can be switched to the OFF state prior to switching any of the EPMs 510 in attraction section 511 to the ON state, and in process 800, all EPMs 510 in attraction section 511 can be switched to the OFF state prior to switching any of the EPMs 512 in repulsion section 513 to the ON state. In this manner, the magnetic system as a whole can transition smoothly from repulsion through neutral to attraction and in the reverse direction.

Alternatively, if desired, controller 630 can use a different sequence (e.g., alternating between switching a magnetic element in repulsion section 513 to the OFF state and switching a magnetic element in attraction section 511 to the ON state).

In processes 700 and 800, controller 630 does not need to determine the state of any EPM prior to applying the current pulse; circuit 600 can be designed to deliver a current pulse of sufficient magnitude to switch the magnetic polarization of the EPM to the desired orientation without regard to the orientation direction prior to the pulse. If a particular EPM is already in the desired orientation, the current pulse will have no effect. If desired, controller 630 can track current state of a given EPM and adjust the current pulse accordingly; however, additional power may be required to maintain and/or update stored state information, and net power savings may be negligible or nonexistent.

The particular event signals and order thereof are also illustrative Any number and combination of event signals can be defined, and controller 630 can be configured (e.g., using programming or logic circuitry) to generate appropriate current pulses for the state transition associated with a particular event. The conditions that trigger sending of event signals to controller 630 can be defined in any manner desired without departing from the scope of this disclosure.

In some embodiments, it may not be desirable to leave the magnetic latch disengaged for a prolonged period in the absence of user activity. For example, after executing block 806 of process 800, controller 630 may wait for the "Opened" event signal at block 808 for a prescribed timeout period (e.g., ten seconds, thirty seconds, two minutes). If no "Opened" event signal is received within the timeout period, controller 630 can re-engage the magnetic latch, e.g., by executing blocks 704 and 706 of process 700. Other combinations and sequences of events can also be supported.

Other variations are also possible. For example, it may be desirable to exert different amounts of attractive or repulsive force at different times. In some embodiments, this can be achieved by switching some but not all switchable magnetic elements in one section or the other to the ON state while switching other switchable magnetic elements in the same section to the OFF state. For example, referring to FIG. 5, four EPMs 510 are shown in attraction section 511 and four EPMs 512 are shown in repulsion section 513. A "full-force" attraction state can be created by operating controller 630 to switch all four EPMs 510 to the ON state and all four EPMs 512 to the OFF state (e.g., using process 700). A "half-force" attraction state can be created by operating controller 630 to switch one pair of adjacent EPMs 510 (e.g., the two outermost EPMs 510) to the ON state and switch the two remaining EPMs 510 and all four EPMs 512 to the OFF state. In a similar manner, full-force repulsion and half-force repulsion states can also be created. Event signals to controller 630 can indicate which state should be entered, and controller 630 can generate the appropriate sequence of gate voltages to establish a particular state in response to a particular event signal. (For instance, appropriate sequences for different states can be stored in a lookup table in association with the corresponding event signal.)

If desired, controller 630 can include an output signal path that can return information about the current state of the magnetic system to other system components. For instance, controller 630 can send output signals indicating the ON or OFF state of switchable magnetic elements based on the most recently delivered current pulse to each element. Such information can be used, e.g., to activate or deactivate indicator lights, to generate notification messages, to enable various security features, or the like.

Figure 9:
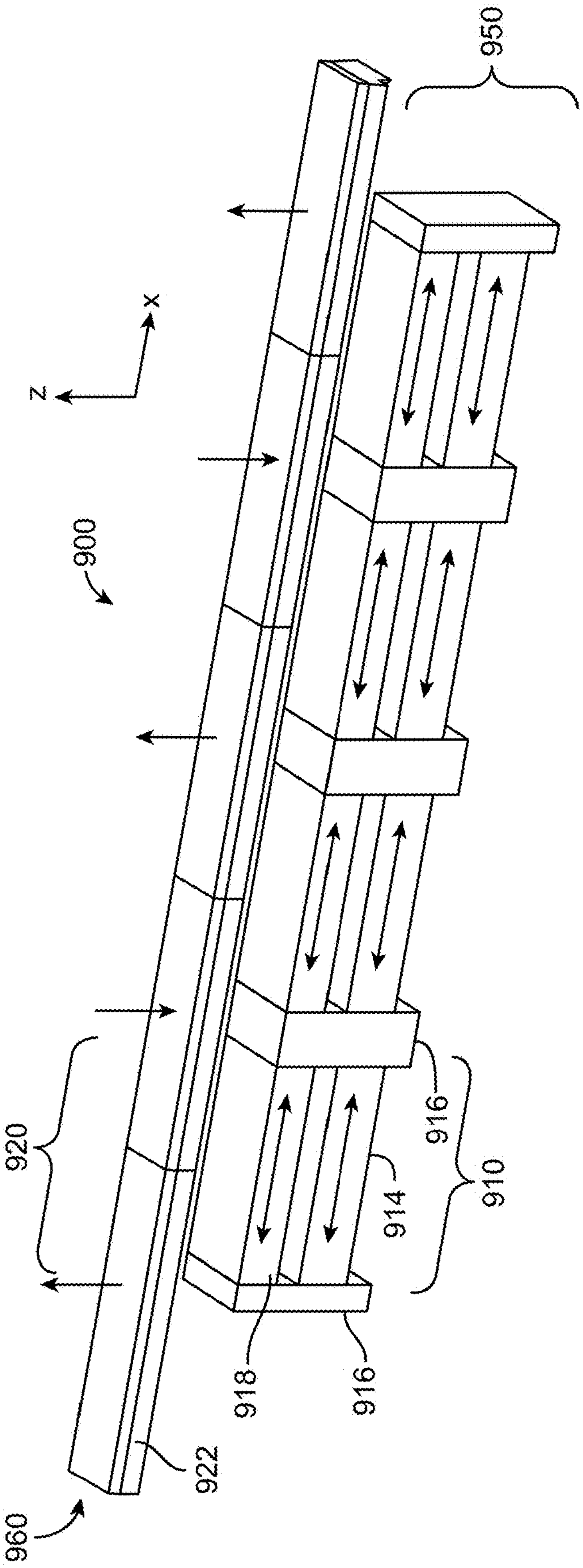
FIG. 9 shows a simplified perspective view of a dual-action magnetic system according to some embodiments.

In embodiments such as device 500 described above, a dual-action magnetic system includes different sections, with one pair of sections (e.g., sections 511 and 521) providing a switchable attractive magnetic force and another pair of sections (e.g., sections 513 and 523) providing a switchable repulsive magnetic force. In some alternative embodiments, switchable magnetic elements can be used to provide both attractive and repulsive forces on the same fixed magnet array (at different times). FIG. 9 shows a simplified perspective view of a dual-action magnetic system 900 according to some embodiments. Magnetic system 900 includes a controllable magnet array 950 and a fixed magnet array 960. Fixed magnet array 960 can be similar or identical to fixed magnet array 260 described above. For example, each fixed magnetic element 920 can include permanent magnets 922*a*, 922*b* (corresponding to permanent magnets 122*a*, 122*b* in FIGS. 1A and 1B) having magnetic polarity in opposite directions (as indicated by arrows 923*a*, 923*b*) and a support plate 924 (corresponding to support plate 124 in FIGS. 1A and 1B). Permanent magnets 922*a*, 922*b* alternate polarity direction along the length of fixed magnet array 960, and the same permanent magnet can be shared between adjacent fixed magnetic elements 920, e.g., by centering permanent magnets 922*a*, 922*b* over pole pieces 916.

Controllable magnet array 950 can include an array of EPMs 910 arranged end-to-end. In this example, each EPM 910 includes two switchable magnets 914, 918. Each switchable magnet 914, 918 can be implemented similarly to switchable magnet 114 of FIG. 1A and can be, for example, an AlNiCo magnet with a coil of wire wrapped around it. A gap can be provided between switchable magnets 914 and 918, similar to gap 115 in FIG. 1. Pole pieces 916 (corresponding to pole pieces 116 in FIGS. 1A and 1B and pole pieces 216 in FIG. 2) can be disposed at either end of each EPM 910. As in controllable magnet array 250, pole pieces 916 can be shared between adjacent EPMs 910. Each switchable magnet 914 and each switchable magnet 918 can be independently switchable (using current pulses as described above) between a first state in which the magnetic polarity of the switchable magnet 914 (or 918) is oriented in the +x direction and a second state in which the magnetic polarity of the switchable magnet 914 (or 918) is oriented in the −x direction.

In this configuration, each EPM 910 has a first ON state in which both of switchable magnets 914 and 918 have magnetic polarity oriented in the +x direction, a second ON state in which both of switchable magnets 914 and 918 both have magnetic polarity oriented in the −x direction, and an OFF state in which switchable magnets 914 and 918 have magnetic polarity oriented in antiparallel directions. Current pulses can be applied to one or both of switchable magnets 914 and 918 to switch among the three states.

By switching the states of EPMs 910 among the three states, it is possible to obtain both attraction and repulsion at different times. For instance in a first configuration where adjacent EPMs 910 are in ON states oriented in opposite directions, magnetic flux as shown in FIG. 2 can be generated, creating an attractive force on fixed magnet array 960. In this configuration, magnetic system 900 behaves like magnetic system 200 of FIG. 2. Likewise, in a second configuration (where each EPM 910 is switched to its other ON state), magnetic flux as shown in FIG. 1C can be generated, creating a repulsive force on fixed magnet array 960. In this configuration, magnetic system 900 behaves like magnetic system 400 of FIG. 4. Further, by switching all EPMs 910 to the OFF state, a state with minimal force on fixed magnet array 960 (and limited stray flux from controllable magnet array 950) can be achieved. In some embodiments, attractive or repulsive magnetic forces of varying strength can be created by combining different states of different EPMs 910.

While the invention has been described with reference to specific embodiments, those skilled in the art will appreciate that variations and modifications are possible. For instance, the size of the magnetic elements and number of EPMs in the controllable magnet arrays can be varied, and the size and number of permanent magnets in the fixed magnet arrays can be correspondingly varied. In some embodiments, multiple controllable magnet arrays can be provided in a magnetic system, and operation of the controllable magnet arrays can be coordinated using a shared controller. All materials described herein are illustrative, and other materials with appropriate magnetic properties (as described above) can be substituted. In some embodiments, controllable magnet arrays of the kind described herein can be used with an appropriately shaped magnetic shunt (e.g., a piece of soft magnetic material such as steel) in place of the fixed magnet array; those skilled in the art will appreciate that where a magnetic shunt is used in place of the fixed magnet array, only attractive magnetic force would be created.

In examples described above, controllable magnet arrays and corresponding fixed magnet arrays have the magnets arranged in a straight line. Straight lines are used for clarity of illustration, and other embodiments can include magnet arrays having curved sections and/or corners. For example, pole pieces in a controllable magnet array using EPMs can be shaped to provide curvature or corners, and the magnets in the corresponding fixed magnet array can be arranged to correspond to the locations of the pole pieces.

Magnetic systems of the kind described herein can be applied in any context where the ability to selectively apply attractive and/or repulsive force between a first object or surface and a second object or surface is desirable. An example of opening and closing a lid of a laptop is described above; however, many other applications are possible. Other example applications include opening and closing a door, operating a mechanical switch or relay, removably attaching one object to another (e.g., a portable device that can be held on a stand), and so on.

All processes described herein are also illustrative and can be modified. Operations can be performed in a different order from that described, to the extent that logic permits; operations described above may be omitted or combined; and operations not expressly described above may be added.

While various circuits and components are described herein with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Components described as dedicated or fixed-function circuits can be configured to perform operations by providing a suitable arrangement of circuit components (e.g., logic gates, registers, switches, etc.); automated design tools can be used to generate appropriate arrangements of circuit components implementing operations described herein. Components described as processors or microprocessors can be configured to perform operations described herein by providing suitable program code. Various blocks might or might not be reconfigurable depending on how the initial configuration is obtained. Embodiments of the present invention can be realized in a variety of apparatus including electronic devices implemented using a combination of circuitry and software.

It should be understood that directional terms such as "up," "down," "above," "below," and the like are used herein for simplicity of description. Such terms should be understood as distinguishing different direction in a coordinate system that can have any orientation in space.

All numerical values and ranges provided herein are illustrative and may be modified. Unless otherwise indicated, drawings should be understood as schematic and not to scale.

Accordingly, although the invention has been described with respect to specific embodiments, it will be appreciated that the invention is intended to cover all modifications and equivalents within the scope of the following claims.

What is claimed is:

1. A magnetic system comprising:

a controllable magnet array comprising a plurality of electropermanent magnets arranged end-to-end, wherein each electropermanent magnet comprises:

a first permanent magnet disposed proximate to an interface surface and having a fixed magnetic orientation along a longitudinal axis, wherein the fixed magnetic orientations of the first permanent magnets in adjacent electropermanent magnets are opposite to each other;

a switchable magnet comprising a core made of a magnetic material and a coil of wire wound around the core along a longitudinal axis of the core, wherein the switchable magnet is positioned on a distal side of the first permanent magnet and spaced apart from the first permanent magnet; and pole pieces disposed at each longitudinal end of the first permanent magnet and the switchable magnet, the pole pieces being made of a soft magnetic material and extending across end surfaces of the first permanent magnet and the electropermanent magnet, wherein pole pieces are shared between adjacent electropermanent magnets in the controllable magnet array;

a fixed magnet array comprising an array of second permanent magnets arranged parallel to the interface surface such that each second permanent magnet aligns with one of the pole pieces of the controllable magnet array, wherein adjacent second permanent magnets have fixed magnetic polarizations in opposite directions toward or away from the interface surface; and a control and driver circuit coupled to each of the coils and configured to supply current pulses to the coils to switch a direction of magnetic polarization of the cores of the electropermanent magnets, thereby switching the electropermanent magnets between an ON state in which a direction of magnetic polarization of the core is parallel to the magnetic polarization of the first permanent magnet and an OFF state in which the direction of magnetic polarization of the core is antiparallel to the magnetic polarization of the first permanent magnet, wherein the control and driver circuit is configured to supply current pulses to different coils independently of each other.

2. The magnetic system of claim 1 wherein at least some of the second permanent magnets in the fixed magnet array are aligned relative to the first permanent magnets such that when the electropermanent magnets are in the ON state, an attractive magnetic force is produced between the fixed magnet array and the controllable magnet array.

3. The magnetic system of claim 2 wherein the control and driver circuit is further configured to modify a magnitude of the attractive magnetic force by switching a subset of the electropermanent magnets between the ON state and the OFF state.

4. The magnetic system of claim 1 wherein at least some of the second permanent magnets in the fixed magnet array are aligned relative to the first permanent magnets such that when the electropermanent magnets are in the ON state, a repulsive magnetic force is produced between the fixed magnet array and the controllable magnet array.

5. The magnetic system of claim 1 wherein the controllable magnet array and the fixed magnet array include:

a first section in which the second permanent magnets are aligned relative to the first permanent magnets such that when the electropermanent magnets in the first section of the controllable magnet array are in the ON state, an attractive magnetic force is produced between the first section of the fixed magnet array and the first section of the controllable magnet array; and a second section in which the second permanent magnets are aligned relative to the first permanent magnets such that when the electropermanent magnets in the second section of the controllable magnet array are in the ON state, a repulsive magnetic force is produced between the second section of the fixed magnet array and the second section of the controllable magnet array.

6. The magnetic system of claim 5 wherein the control and driver circuit is configured to supply current pulses such that:

when the electropermanent magnets in the first section of the controllable magnet array are in the ON state, the electropermanent magnets in the second section of the controllable magnet array are in the OFF state; and when the electropermanent magnets in the second section of the controllable magnet array are in the ON state, the electropermanent magnets in the first section of the controllable magnet array are in the OFF state.

7. The magnetic system of claim 1 wherein the control and driver circuit is configured such that the current pulses are supplied to the coils of different ones of the switchable magnets sequentially.

8. The magnetic system of claim 1 wherein the control and driver circuit includes gating circuitry to prevent ringing in the coils following a current pulse.

9. The magnetic system of claim 1 wherein the first permanent magnets are made of a first magnetic material having a first coercivity and the switchable magnets are made of a second magnetic material having a second coercivity, the second coercivity being lower than the first coercivity.

10. A device comprising:

a first object having a first interface surface, the first object including an controllable magnet array comprising a plurality of electropermanent magnets arranged end-to-end proximate to the first interface surface, wherein each electropermanent magnet comprises:

a first permanent magnet disposed proximate to the first interface surface and having a fixed magnetic orientation along a longitudinal axis, wherein the fixed magnetic orientations of the first permanent magnets in adjacent electropermanent magnets are opposite to each other;

a switchable magnet comprising a core made of a magnetic material and a coil of wire wound around the core along a longitudinal axis of the core, wherein the switchable magnet is positioned on a distal side of the first permanent magnet and spaced apart from the first permanent magnet; and pole pieces disposed at each longitudinal end of the first permanent magnet and the switchable magnet, the pole pieces being made of a soft magnetic material and extending across end surfaces of the first permanent magnet and the electropermanent magnet, wherein pole pieces are shared between adjacent electropermanent magnets in the controllable magnet array;

a second object having a second interface surface, the second object being positionable relative to the first object such that the second interface surface abuts the first interface surface, the second object including a fixed magnet array comprising an array of second permanent magnets arranged proximate to the second interface surface such that each second permanent magnet aligns with one of the pole pieces of the controllable magnet array, wherein adjacent second permanent magnets have fixed magnetic polarizations in opposite directions toward or away from the interface surface; and a control and driver circuit coupled to each of the coils and configured to supply current pulses to the coils to switch a direction of magnetic polarization of the cores of the electropermanent magnets, thereby switching the electropermanent magnets between an ON state in which a direction of magnetic polarization of the core is parallel to the magnetic polarization of the first permanent magnet and an OFF state in which the direction of magnetic polarization of the core is antiparallel to the magnetic polarization of the first permanent magnet, wherein the control and driver circuit is configured to supply current pulses to different coils at different times.

11. The device of claim 10 wherein the control and driver circuit is disposed within the first object.

12. The device of claim 10 wherein the first object is a base that includes a keyboard oriented toward the first interface surface and the second object is a lid that includes display oriented toward the second interface surface, and wherein the first object and the second object are connected by a hinge such that rotational movement of the first object or the second object about the hinge moves the first and second interface surfaces toward or away from each other.

13. The device of claim 10 wherein at least some of the second permanent magnets in the fixed magnet array are aligned relative to the first permanent magnets such that when the electropermanent magnets are in the ON state, an attractive magnetic force is produced between the fixed magnet array and the controllable magnet array.

14. The device of claim 10 wherein at least some of the second permanent magnets in the fixed magnet array are aligned relative to the first permanent magnets such that when the electropermanent magnets are in the ON state, a repulsive magnetic force is produced between the fixed magnet array and the controllable magnet array.

15. The device of claim 10 wherein the controllable magnet array and the fixed magnet array include:

a first section in which the second permanent magnets are aligned relative to the first permanent magnets such that when the electropermanent magnets in the first section of the controllable magnet array are in the ON state, an attractive magnetic force is produced between the first section of the fixed magnet array and the first section of the controllable magnet array; and a second section in which the second permanent magnets are aligned relative to the first permanent magnets such that when the electropermanent magnets in the second section of the controllable magnet array are in the ON state, a repulsive magnetic force is produced between the second section of the fixed magnet array and the second section of the controllable magnet array.

16. The device of claim 15 wherein the control and driver circuit is configured to supply current pulses such that:

when the electropermanent magnets in the first section of the controllable magnet array are in the ON state, the electropermanent magnets in the second section of the controllable magnet array are in the OFF state; and when the electropermanent magnets in the second section of the controllable magnet array are in the ON state, the electropermanent magnets in the first section of the controllable magnet array are in the OFF state.

17. The device of claim 15 wherein the control and driver circuit is configured such that:

in response to receiving a close event signal, the control and driver circuit first supplies current pulses to switch the electropermanent magnets in the second section to the OFF state, then supplies current pulses to switch the electropermanent magnets in the first section to the ON state; and in response to receiving a release event signal, the control and driver circuit first supplies current pulses to switch the electropermanent magnets in the first section to the OFF state, then supplies current pulses to switch the electropermanent magnets in the second section to the ON state.

18. A magnetic system comprising:

a controllable magnet array comprising a plurality of electropermanent magnets placed end-to-end, wherein each electropermanent magnet comprises:

a first switchable magnet comprising a first core made of a magnetic material and a first coil of wire wound around the first core along a longitudinal axis of the first core, wherein the first switchable magnet is disposed proximate to an interface surface;

a second switchable magnet comprising a second core made of a magnetic material and a second coil of wire wound around the second core along a longitudinal axis of the second core, wherein the second switchable magnet is positioned on a distal side of the first switchable magnet and spaced apart from the first switchable magnet; and pole pieces disposed at each longitudinal end of the first switchable magnet and the second switchable magnet, the pole pieces being made of a soft magnetic material and extending across end surfaces of the first switchable magnet and the second switchable magnet, wherein pole pieces are shared between adjacent electropermanent magnets in the controllable magnet array;

a fixed magnet array comprising an array of permanent magnets arranged parallel to the interface surface such that each permanent magnet aligns with one of the pole pieces of the controllable magnet array, wherein adjacent permanent magnets have magnetic polarizations in opposite directions toward or away from the interface surface; and a control and driver circuit coupled to each of the first coils and each of the second coils and configured to supply current pulses to the first coils and the second coils, thereby switching the electropermanent magnets among a first ON state in which the magnetic polarizations of the first and second switchable magnets are parallel and in a first longitudinal direction, a second ON state in which the magnetic polarizations of the first and second switchable magnets are parallel and in a second longitudinal direction opposite the first longitudinal direction, and an OFF state in which the magnetic polarizations of the first and second switchable magnets are in antiparallel longitudinal directions.

19. The magnetic system of claim 18 wherein when all of the electropermanent magnets are in either the first ON state or the second ON state, the magnetic polarizations of the first and second switchable magnets in adjacent electropermanent magnets are opposite to each other and the pole pieces direct magnetic flux toward or away from the fixed magnet array, and when all of the electropermanent magnets are in the OFF state, the pole pieces direct magnetic flux within the electropermanent magnets.

20. The magnetic system of claim 19 wherein the permanent magnets in the fixed magnet array are arranged such that when the electropermanent magnets are in the first ON state, the magnetic flux produces an attractive force on the fixed magnet array and when the electropermanent magnets are in the second ON state, the magnetic flux produces a repulsive force on the fixed magnet array.

* * * * *